United States Patent [19]

Goldstein

[11] Patent Number: 5,560,034
[45] Date of Patent: Sep. 24, 1996

[54] SHARED COMMAND LIST

[75] Inventor: Judith Goldstein, Hillsboro, Oreg.

[73] Assignee: Intel Corporation, Santa Clara, Calif.

[21] Appl. No.: 411,384

[22] Filed: Mar. 28, 1995

Related U.S. Application Data

[63] Continuation of Ser. No. 88,546, Jul. 6, 1993, abandoned.

[51] Int. Cl.$^6$ ........................................ F06F 9/00
[52] U.S. Cl. .............................. 395/800; 395/163
[58] Field of Search .................... 395/800, 375, 395/162–166, 100

[56] References Cited

U.S. PATENT DOCUMENTS 4,525,778  6/1985  Cane ........................ 395/425
5,225,978  7/1993  Petersen et al. .................. 364/408
5,295,249  3/1994  Blaner et al. .................... 395/375
5,459,835  10/1995 Toevett ........................... 395/163
6,301,302  4/1994  Blackard et al. ................. 395/500
6,450,544  12/1995 Dixon et al. ..................... 395/164

*Primary Examiner*—Eric Coleman
*Assistant Examiner*—Alpesh M. Shah
*Attorney, Agent, or Firm*—William H. Murray; N. Stephan Kinsella

[57] ABSTRACT

A method and apparatus for processing digital video data with a first processor and a second processor, wherein the two processors run asynchronously. First and second processor offsets are associated with the first and second processors, respectively. Commands for the two processors are stored in a set queue residing in memory shared by the two processors. The first and second processor offsets are compared to determine whether only one processor or both processors may implement commands.

15 Claims, 2 Drawing Sheets

SHARED COMMAND LIST

This is a continuation of application Ser. No. 08/088,546 filed on Jul. 6, 1993, now abandoned.

BACKGROUND OF THE INVENTION

1. Field of the Invention

The present invention relates to digital video, and, in particular, to the use of data structures that are shared among multiple processors in a digital video processing system.

2. Statement of Related Art

In digital video systems, digital video data may be controlled and processed by multiple processors running asynchronously. A typical system may comprise a host processor and a dedicated video processor that control and process the digital video data. Among other functions, the dedicated video processor may work to compress and decompress digital video data, as well as to perform copy/scale operations on decompressed digital video images. The operation of the host and video processors is controlled by commands that may be stored in memory that is shared between both processors.

SUMMARY OF THE INVENTION

The present invention is a method for processing digital video data with a first processor and a second processor, wherein the first and second processors run asynchronously. According to the method, a plurality of first processor commands and one or more second processor commands are stored in a set queue residing in memory shared by the first and second processors. The first processor has associated with it a first processor offset and the second processor has associated with it a second processor offset. The first processor offset is compared with the second processor offset to determine whether the second processor may implement the second processor commands. If so, then the first processor commands are implemented by the first processor and the second processor commands are implemented by the second processor. Otherwise, only the first processor commands are implemented by the first processor.

The present invention is also an apparatus for processing digital video data, comprising a first processor, a second processor, and shared memory. The first processor processes a plurality of first processor commands and has associated with it a first processor offset. The second processor, running asynchronously to the first processor, processes second processor commands and has associated with it a second processor offset. The commands for the first and second processors are stored in a set queue in shared memory. The second processor processes at least one of the second processor commands in accordance with the relative values of the first and second processor offsets.

DETAILED DESCRIPTION OF THE INVENTION

Figure 1:
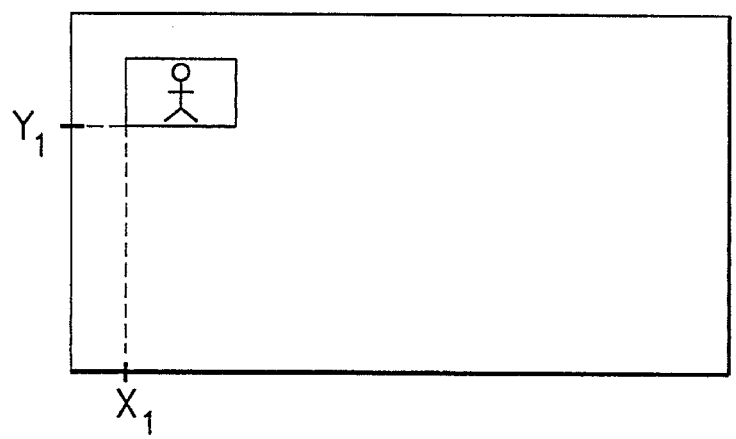
FIGS. 1, 2, and 3 show schematic representations of a digital video window being displayed at different locations on a video monitor.

In accordance with the present invention, two asynchronous processors, a host processor 501 and a dedicated video processor 502, control and process the digital video data. An exemplary digital video processor for use in conjunction with the present invention is the i750 PB® processor manufactured by Intel® Corporation. The present invention provides a system for storing and implementing commands that allows multiple operations of video processor 502 to be performed in an "atomic" fashion relative to host processor 501.

According to the present invention, commands and data values used by host and video processors 501, 502 are stored together in data structures that will be referred to as "set queues" that reside in a shared memory 503. A set queue may be a circular list of commands that controls the processing of digital video data. This type of set queue is referred to as a command list set queue. Alternatively, a set queue may be used to hold variables that define other data structures (such as sequences of compressed or uncompressed digital video data frames) that also reside in memory. This latter type of set queue is referred to as a frame synchronous set queue.

A command list set queue is a circular list of host and video processor commands for performing various operations such as changing the display coordinates, or display size. Since some of the commands in the command list set queue are to be performed by host processor 501 and others by video processor 502, each processor has associated with it a "pointer" or "offset" that indicates the next command to be implemented by that processor. In other words, the host offset indicates the location in the command list set queue of the next host command to be implemented, while the video offset indicates the location in the command list set queue of the next video command to be implemented.

The command list set queue allows host processor 501 and video processor 502 to perform their own sequences of commands, even though the commands themselves are stored together in a shared data structure residing in shared memory. The sequence in which host processor 501 commands are implemented is controlled by the host pointer. Similarly, the video pointer controls the sequence of implementation of video processor 502 commands.

Since processors 501 and 502 are running asynchronously, the timing of the implementation of host processor commands relative to that of the video processor commands is normally not controlled. For many operations, the relative timing or interleaving of the host and video processor commands is not important. However, there are other operations for which the interleaving of host and video processor commands is important. In particular, there are operations for which a series of video processor commands are required to be performed without "interruption" by a host command. That is, where no host processor command is performed between the first and last commands in that series of video processor commands. In such a case, the series of video processor commands appears "atomic" to host processor 501.

The present invention uses a command list set queue to allow multiple video processor commands to appear atomic to host processor 501. According to the present invention, host processor 501 compares the host offset (which points to the next host processor command in the command list set queue) to the video offset (which points to the next video processor command in the command list set queue) to determine whether host processor 501 is permitted to perform its next operation. As long as the host offset is not equal to the video offset, host processor 501 does not perform its next operation.

Thus, while the host offset is not equal to the video offset, video processor 502 performs its commands without "interruption" by implementation of any host processor commands. Once the host offset and the video offset are equal, host processor 501 may then perform its next command. As a result, the series of commands performed by video processor 502 during the period in which the host and video offsets were not equal, appear atomic to host processor 501.

Figure 2:
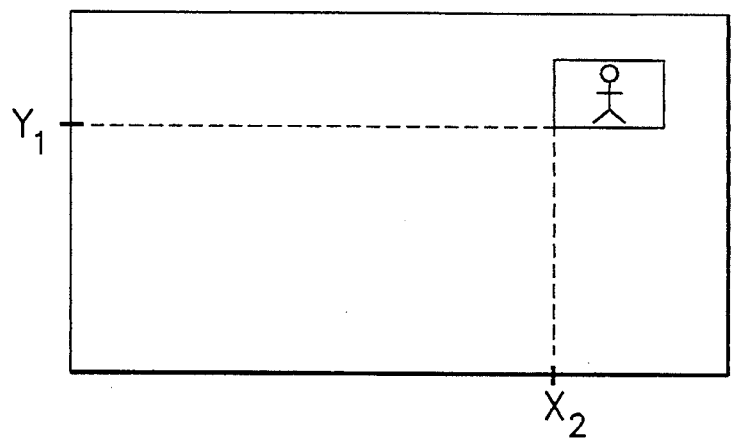
Figure 3:
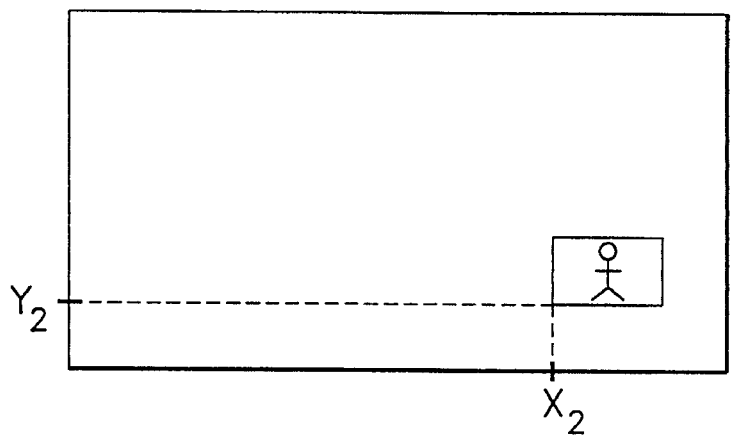

FIGS. 1, 2, and 3 illustrate a particular application of the present invention. FIG. 1 shows a schematic representation of a digital video image being displayed in a window located in the upper left corner of a video monitor. In FIG. 1, the digital video image is displayed in a window located at coordinates $(X_1, Y_1)$. FIGS. 2 and 3 show schematic representations of the same digital video image being displayed in windows located at the upper right and lower right corners of the same video monitor, respectively. In FIGS. 2 and 3, the digital video image is displayed in windows located at coordinates $(X_2, Y_1)$ and $(X_2, Y_2)$, respectively.

In a digital video system, host processor 501 may execute commands that function to play a sequence of a digital video image on the monitor, while video processor 502 may execute commands changing various aspects of the digital video being displayed, e.g., video processor 502 may execute commands changing the coordinates of the window on the video monitor used to display the digital video. In playing the digital video sequence, host processor 501 will use data values stored in the frame synchronous set queue. Among other variables, the coordinates of the window to be used to display the digital video may be stored in the frame synchronous set queue.

Figure 4:
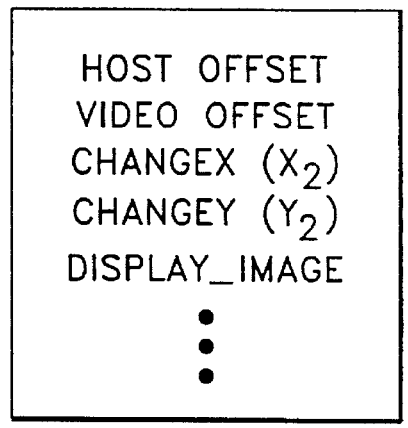
FIG. 4 shows a command list set queue for displaying the digital video image of FIG. 3.
Figure 5:
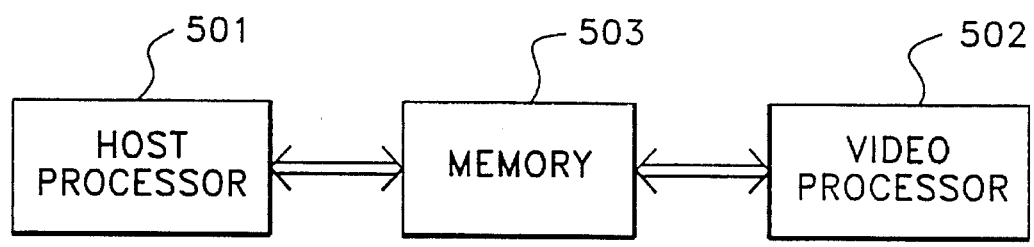
FIG. 5 is a block diagram of a host processor, video processor, and shared memory, in accordance with the present invention.

Operation of the present invention may be understood by way of the following example wherein "DISPLAY$_{13}$ IMAGE" is the host processor command that functions to play a digital video sequence, "CHANGEX (value)" is the video processor command that changes the X-coordinate of the window used to display for the digital video sequence to the value specified, and that "CHANGEY (value)" is the analogous video processor command for the Y-coordinate. In accordance with the present invention, the commands CHANGEX $(X_2)$, CHANGEY $(Y_2)$, and DISPLAY_IMAGE may be used to move the location of the digital video window from the upper left corner of the video monitor as depicted in FIG. 1 to the lower right corner as depicted in FIG. 3 without having the window ever appear in an intermediate location such as shown in FIG. 2. These three commands may be stored in shared memory in a command list set queue, such as represented in FIG. 4. Since the host and video processors 501, 502 run asynchronously, were it not for the present invention, host processor 501 could implement the DISPLAY_IMAGE command after video processor 502 implemented the CHANGEX command but before video processor 502 implemented the CHANGEY command. In this case, the video image would be displayed in the window at the intermediate location depicted in FIG. 2.

According to the present invention, as depicted in FIG. 4, in addition to the commands CHANGEX $(X_2)$, CHANGEY $(Y_2)$, and DISPLAY_IMAGE, the command list set queue contains values for the host and video offsets. To achieve the desired result, the values for host and video offsets are such that, after video processor 502 implements the CHANGEX command, the host and video offsets are not equal. Host processor 501 recognizes this condition and is therefore prevented from implementing the DISPLAY_IMAGE command. After video processor 502 has implemented the CHANGEY command, the host and video offset values become equal and host processor 501 is then free to implement the DISPLAY_IMAGE command.

Therefore, under the present invention, video processor 502 implements both the CHANGEX and CHANGEY commands before host processor 501 implements the DISPLAY_IMAGE command. This ensures that the next image displayed will move directly to the window at the lower right corner of the video monitor as desired. To host processor 501, the performance by video processor 502 of the two separate commands CHANGEX and CHANGEY is atomic, that is, as if the operations were implemented by a single command.

It will be understood by those skilled in the art that the example presented in FIGS. 1, 2, 3, and 4 is merely illustrative of the use of command list set queues according to the present invention. It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method for processing digital video data with a first processor fox implementing sequences of first processor commands of a plurality of first processor commands and with a second processor for implementing sequences of second processor commands of a plurality of second processor commands, wherein the first and second processors run asynchronously, the method comprising the steps of:

(a) storing the plurality of first processor commands and the plurality of second processor commands in a set queue residing in memory shared by the first and second processors, wherein:

a first processor offset is associated with the first processor for indicating the location in the set queue of a next first processor command to be implemented by the first processor; and a second processor offset is associated with the second processor for indicating the location in the set queue of a next second processor command to be implemented by the second processor;

(b) comparing the first processor offset with the second processor offset to determine whether the second processor may implement the next second processor command; and (c) if the second processor may implement the next second processor command, then implementing the next first processor command with the first processor and implementing the next second processor command with the second processor, else implementing only the next first processor command with the first processor, wherein:

an atomic sequence of first processor commands comprises a sequence of first processor commands that is required to be performed by the first processor without interruption by the second processor performing selected next second processor commands of the plurality of second processor commands; and values of the first and second processor offsets are such that after the first processor implements an initial command of an atomic sequence of first processor commands, the first and second processor offsets are not equal.

2. The method of claim 1, wherein the second processor may implement the next second processor command if and only if the first processor offset is equal to the second processor offset.

3. The method of claim 1, wherein the set queue comprises a command list set queue comprising a circular list of first and second processor commands.

4. The method of claim 1, wherein the first processor comprises a video processor and the second processor comprises a host processor.

5. The method of claim 1, wherein:
the second processor may implement the next second processor command if and only if the first processor offset is equal to the second processor offset;
the set queue comprises a command list set queue comprising a circular list of first and second processor commands; and
the first processor comprises a video processor and the second processor comprises a host processor.

6. An apparatus for processing digital video data, the apparatus comprising:
(a) a first processor for implementing sequences of first processor commands of a plurality of first processor commands;
(b) a second processor for implementing sequences of second processor commands of a plurality of second processor commands, wherein the second processor runs asynchronously to the first processor;
(c) a memory shared by the first and second processors and comprising a set queue for storing the plurality of first processor commands and the plurality of second processor commands, wherein:
a first processor offset is associated with the first processor for indicating the location in the set queue of a next first processor command to be implemented by the first processor; and
a second processor offset is associated with the second processor for indicating the location in the set queue of a next second processor command to be implemented by the second processor;
(d) means for comparing the first processor offset with the second processor offset to determine whether the second processor may implement the next second processor command, wherein:
if the second processor may implement the next second processor command, then the first processor implements the next first processor command and the second processor implements the next second processor command;
else the first processor implements the next first processor command and the second processor does not implement the next second processor command; further wherein:
an atomic sequence of first processor commands comprises a sequence of first processor commands that is required to be performed by the first processor without interruption by the second processor performing selected next second processor commands of the plurality of second processor commands; and
values of the first and second processor offsets are such that after the first processor implements an initial command of an atomic sequence of first processor commands, the first and second processor offsets are not equal.

7. The apparatus of claim 6, wherein the second processor may implement the next second processor command if and only if the first processor offset is equal to the second processor offset.

8. The apparatus of claim 6, wherein the set queue comprises a command list set queue comprising a circular list of first and second processor commands.

9. The apparatus of claim 6, wherein the first processor comprises a video processor and the second processor comprises a host processor.

10. The apparatus of claim 6, wherein:
the second processor may implement the next second processor command if and only if the first processor offset is equal to the second processor offset;
the set queue comprises a command list set queue comprising a circular list of first and second processor commands; and
the first processor comprises a video processor and the second processor comprises a host processor.

11. A storage medium encoded with machine-readable computer program code for processing digital video data, the storage medium comprising:
(a) means for causing a first processor of a computer to implement sequences of first processor commands of a plurality of first processor commands;
(b) means for causing a second processor of the computer to implement sequences of second processor commands of a plurality of second processor commands, wherein the second processor runs asynchronously to the first processor;
(c) means for causing a memory shared by the first and second processors and comprising a set queue to store the plurality of first processor commands and the plurality of second processor commands, wherein:
a first processor offset is associated with the first processor for indicating the location in the set queue of a next first processor command to be implemented by the first processor; and
a second processor offset is associated with the second processor for indicating the location in the set queue of a next second processor command to be implemented by the second processor;
(d) means for causing the computer to compare the first processor offset with the second processor offset to determine whether the second processor may implement the next second processor command, wherein:
if the second processor may implement the next second processor command, then the first processor implements the next first processor command and the second processor implements the next second processor command;
else the first processor implements the next first processor command and the second processor does not implement the next second processor command; further wherein:
an atomic sequence of first processor commands comprises a sequence of first processor commands that is required to be performed by the first processor without interruption by the second processor performing selected next second processor commands of the plurality of second processor commands; and
values of the first and second processor offsets are such that after the first processor implements an initial command of an atomic sequence of first processor commands, the first and second processor offsets are not equal.

12. The storage medium of claim 11, further comprising means for causing the second processor to implement the next second processor command if and only if the first processor offset is equal to the second processor offset.

13. The storage medium of claim 11, wherein the set queue comprises a command list set queue comprising a circular list of first and second processor commands.

14. The storage medium of claim 11, wherein the first processor comprises a video processor and the second processor comprises a host processor.

15. The storage medium of claim 11, wherein:

the second processor may implement the next second processor command if and only if the first processor offset is equal to the second processor offset;

the set queue comprises a command list set queue comprising a circular list of first and second processor commands; and the first processor comprises a video processor and the second processor comprises a host processor.

* * * * *

UNITED STATES PATENT AND TRADEMARK OFFICE
CERTIFICATE OF CORRECTION

PATENT NO.    :   5,560,034
DATED         :   September 24, 1996
INVENTOR(S)   :   Judith Goldstein It is certified that error appears in the above-identified patent and that said Letters Patent is hereby corrected as shown below:

Column 4, line 30, delete "fox" and insert therefor --for--.

Signed and Sealed this

Thirteenth Day of May, 1997

Attest:

BRUCE LEHMAN

Attesting Officer                Commissioner of Patents and Trademarks